Nov. 16, 1926.

B. W. KING 1,606,766

BARREL FOR COMPUTING SCALES

Filed Jan. 24. 1925   2 Sheets-Sheet 1

INVENTOR.
Bert W. King
BY
Stuart C. Barnes
ATTORNEY.

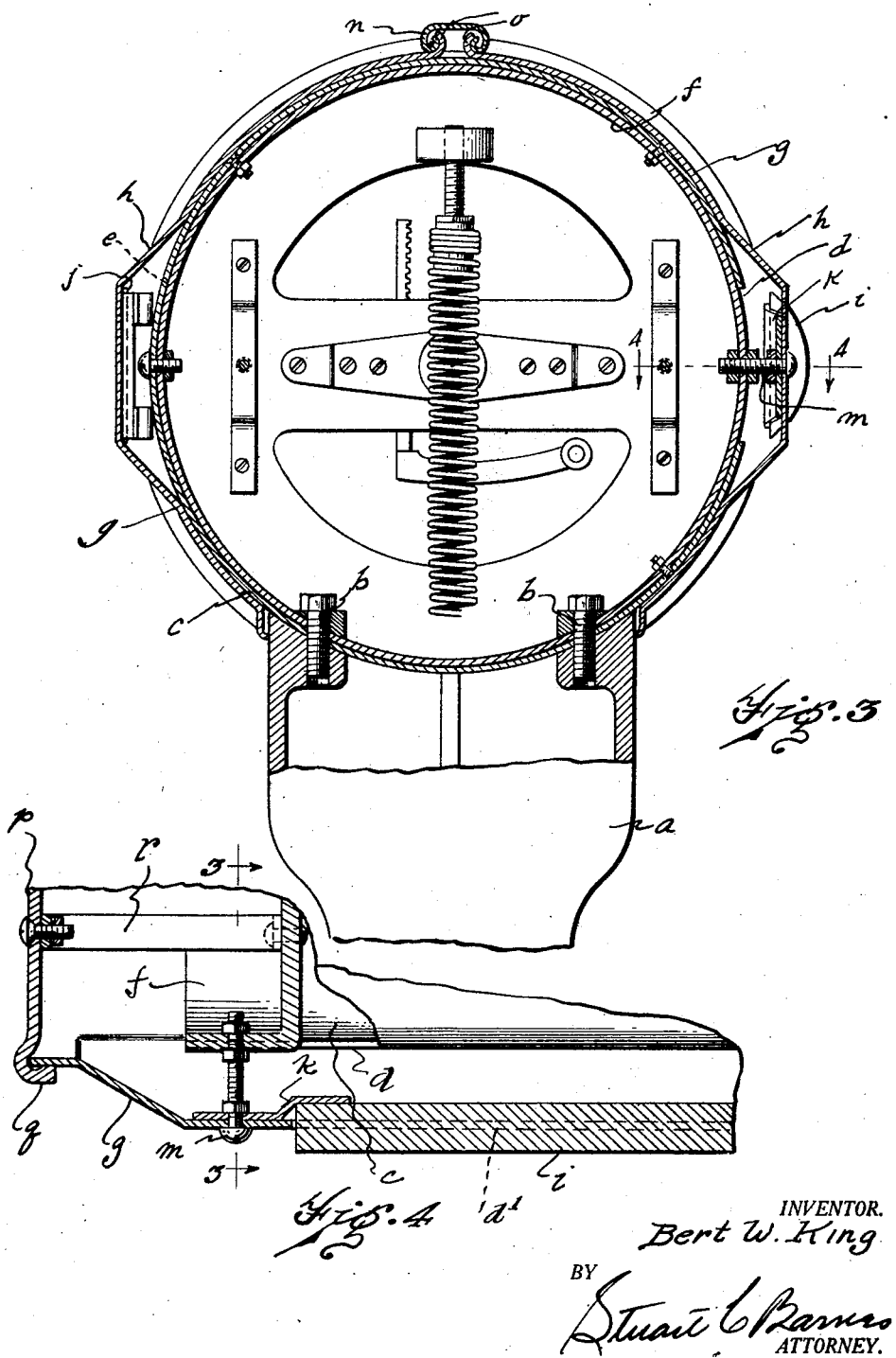

Patented Nov. 16, 1926.

1,606,766

UNITED STATES PATENT OFFICE.

BERT W. KING, OF DETROIT, MICHIGAN, ASSIGNOR TO BARNES SCALE COMPANY, OF DETROIT, MICHIGAN, A CORPORATION OF MICHIGAN.

BARREL FOR COMPUTING SCALES.

Application filed January 24, 1925. Serial No. 4,464.

This invention relates to barrels for computing scales and has for its object a construction of the barrel so as to eliminate the joints adjacent the sight openings. Also this barrel is provided with longitudinally bossed out portions which materially strengthen the same, and allows the use of a lighter gauge material.

In the preferred form of my construction I use two barrels arranged concentrically, the inner barrel being identical with the one now in use and the outer barrel embodying my improved construction.

In present day scales the sheet metal barrel is enamelled, gilded or painted with a suitable finishing coat, said barrel provided with cut out portions serving as sight openings. Secured to the barrel about the sight openings are additional lens-carrying members which are also enamelled or painted to match the barrel. It is impossible to conceal the joint, and quite often water or other foreign matter will sift through the joint and drop into the inside of the barrel, and in time discolor the cardboard computing cylinder so as to make it necessary to tear the scale down and replace it with a new computing cylinder. With my construction it is impossible for foreign matter to get to the inside of the barrel, which will be more apparent from the following description.

A decided advantage in using two barrels is that the outer one may be removably secured in place, only the outer barrel being enamelled and painted. In shipment the barrel of the scale may be struck or rubbed, thereby injuring the finish, and the manufacturer must replace the injured barrel with a new one. To do this, it is necessary to tear most of the barrel structure down and assemble it again. When doing this, it is necessary to readjust the scale so that the same may be accurate, which obviously entails considerable cost to the manufacturer. With my construction, however, the use of the outer removable barrel permits the outer barrel to be removed without destroying the adjustment of the scale, and it is only a matter of a few minutes to replace the injured or scratched barrel with a new one. The scale will read accurately with only the inner barrel in place, the outer barrel which is removable, serving to provide the finish for the scale. By using these two barrels, obviously, the strength of that portion of the scale is materially increased and the scale is less liable to become seriously damaged. The elimination of the lens-carrying members and the construction of the barrel permits a quicker and cheaper stamping operation, and also a cheaper enamelling operation, thereby materially reducing the manufacturer's cost.

In the drawings:

Fig. 3 is a cross section taken on the line 3—3 of Fig. 4.

Fig. 4 is a cross section taken on the line 4—4 of Fig. 3.

Figure 1:
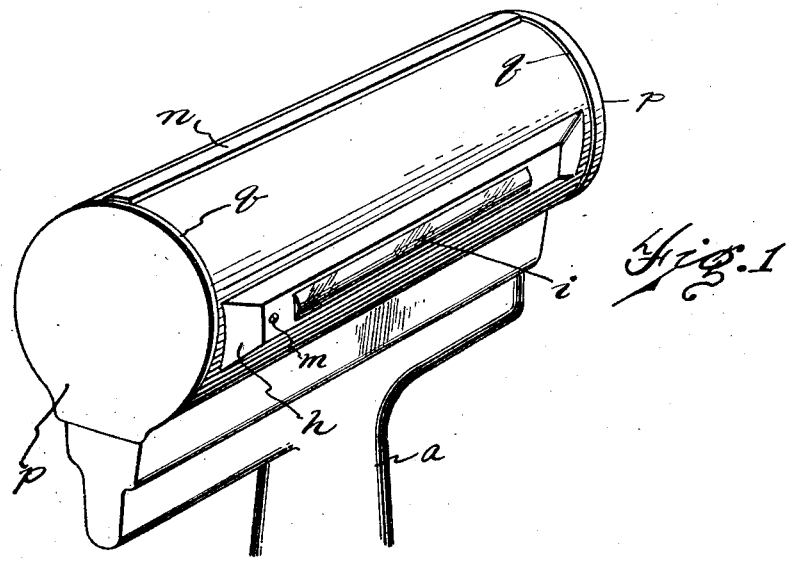
Fig. 1 is a fragmentary perspective of the top of a computing scale.
Figure 2:
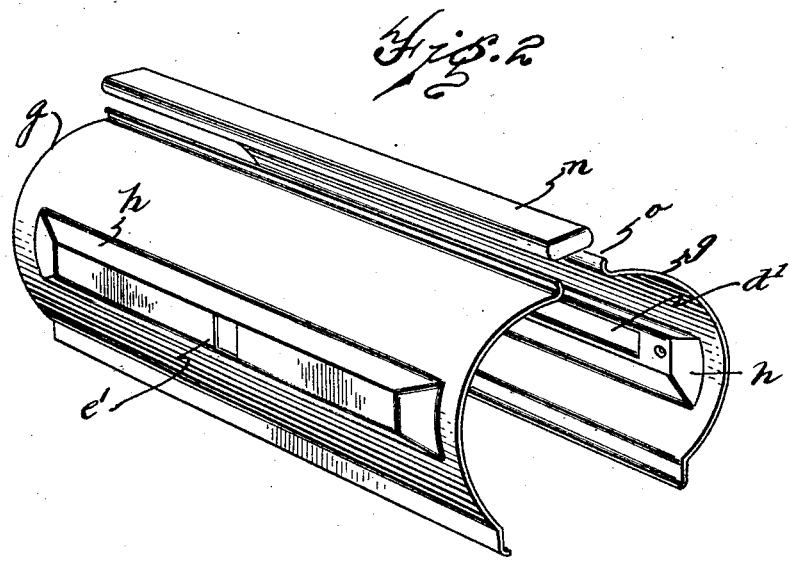
Fig. 2 is a composite view in perspective showing how the outer barrel parts go together.

I employ a standard form of scale construction which consists of pedestal $a$, which is in the form of a casting having an upright hollow shank which spreads out at the top so that the whole pedestal is a T-like casting. I secure to this pedestal in the usual manner by means of the bolts $b$ a barrel $c$ which is formed of a single sheet of metal and is provided with sight openings $d$ and $e$ at the usual places. The end castings $f$ are each secured at one end of the barrel, these end castings supporting that portion of the scale mechanism which is located in the barrel.

Instead of covering the sight openings $d$ and $e$ with separate lens-carrying members I provide a second barrel $g$ formed of two sections, which I term the outer barrel, and which is provided with a longitudinal bossed out portions $h$ having sight openings $d^1$ and $e^1$. Lens $i$ and $j$ are supported in these bossed out portions in the usual manner. Preferably one of the bolts that secure the bracket $k$ to the outer barrel for supporting the lens $i$ is utilized for rigidly securing one of the outer barrel sections to the inner barrel. The bolt $m$ is passed through the outer barrel section and through the flange of the end casting $f$ and suitable lock nuts are used for properly spacing the outer shell of the barrel and the end casting to prevent the collapsing or caving-in of the outer barrel at the point where this bolt is inserted.

Referring to Fig. 3, it will be noticed how this outer barrel is formed of a pair of circular segments locked together at the top by the locking channel strip n, the edges of the barrel segments being turned up as at o, thus permitting the locking strip to be sprung over these up-turned edges to lock the same together. The end plates p are provided with inwardly extended flanges q which surround the outer barrel, and when the end plate is secured to the bracket r, which is in turn secured to the end casting, it will be seen that the outer barrel is securely held in place, but may be readily removed by removing one of the end plates p and taking out the bolts m.

From observing Fig. 3 it will be plainly seen how this outer barrel effectively excludes any drippings from dropping on to the cardboard computing cylinder, as is the case with the present day construction. There is only one possible place for any moisture to leak through, which is at the bottom of the lens, and this moisture after it does leak, drips down between the inner and outer barrels and runs down until it reaches the junction between the pedestal and barrel, and is then deflected down the outside of the pedestal and may be very easily wiped off at that time. Not only does this outer shell construction eliminate the joints and danger resulting therefrom, but it also provides a stronger barrel structure, as the same provides a double wall and is also provided with these longitudinal corrugations or bosses h.

It will be seen that these cylindrical segments which go to make up the outer barrel are exactly alike except for the punching operations which cut the sight openings, $d^1$ and $e^1$. Hence they can be made on a single set of dies. Another advantage is that these cylindrical segments may be more easily enamelled. With the present day construction where the barrel is practically a full circle it is necessary to provide an internal support for the barrel when the same is put into the fusing furnace in the porcelain operation, as the heat tends to curl the barrel up and distort the same. However, in my construction, the circular segments which are less than half of a circle may be readily enamelled without danger of becoming distorted, and thus many of the manufacturer's difficulties are eliminated.

Obviously, the inner barrel could be omitted and the two part barrel used alone. There are several new features embodied in my barrel construction which I desire to claim irrespective of whether the same is used with the inner barrel or not.

What I claim is:

1. In a computing scale construction, the combination with a pedestal, of a barrel comprising a pair of cylinder segments locked together by a lock-seam locking strip, and means for locking said cylinder segments and locking strips to the pedestal.

2. In a computing scale construction, the combination with a pedestal, of a barrel supported thereon and provided with a pair of sheet metal segments having at the top turned-out flanges, a locking channel strip which can be engaged over the said turned-out edges for forming a lock-seam joint for the two sections at the top and means for locking said cylinder segments to the pedestal, thereby locking the locking strip and segments together.

3. In a computing scale, a barrel comprising one or more sheet metal cylinder segments one of which is provided with a relatively deep pressed out longitudinally extending boss having a sight opening in the face of said bossed out portion and to provide a frame which stands out from the cylinder notwithstanding the curvature of the cylinder which causes the body of the metal to fall away near the location of the sight opening and whereby such frame is homogeneously united with the body of the cylinder segment for the purpose of eliminating all joints, a glass lens supported in such bossed out portion and covering such sight opening, and means for retaining said glass on the inside of the pressed out portion.

4. In a computing scale, the combination of a pedestal, and a barrel surmounting the pedestal, and comprising a pair of cylinder segments having sight opening frames embossed out of the segment, and provided with turned-over edges at the top, a lock-seam channel strip engaged over the turned-over edges to lock the sections together and means for locking said cylinder segments and locking strip to the top of the pedestal.

5. In a computing scale, a barrel which includes a stamped metal cylinder segment which is provided with a stamped out substantially rectangular frame having a sight opening, the said frame being in the form of an integral relatively deep protuberance from the face of the cylindrical segment and which has a substantially flat face for the bossed out portion notwithstanding the cylindrical contour from which it is stamped, said sight opening located in said flat face of the bossed out portion, a lens supported on the inside of said bossed out portion and covering the sight opening, and means contained in said relatively deep boss for retaining the said lens in place.

6. In a computing scale, the combination of a pedestal, end castings supported thereon and supporting a portion of the scale mechanism, a barrel concentrically supported on said end castings and comprising a pair of cylinder segments each provided with turned-over edges at the top, one of said segments secured to the end castings, a lock seam channel strip engaged over the turned-over edges to lock the sections together, and end plates secured to said end castings and provided with inwardly extending flanges which engage over the cylinder segments to lock both segments to the end castings and pedestal.

7. In a computing scale, the combination of a pedestal and a barrel supported thereon, and an outer barrel surrounding the first-mentioned barrel and removably secured thereto.

8. In a computing scale, the combination of a pedestal and a barrel supported thereon, and an outer barrel surrounding the first-mentioned barrel and comprising a pair of cylinder segments detachably secured together and to the pedestal.

9. In a computing scale, the combination of a pedestal, a barrel secured to said pedestal, and an outer barrel made up of one or more cylinder segments bearing a finishing coat of enamel or paint on the outside surface and removably secured to said pedestal.

10. In a computing scale, the combination of a pedestal, a barrel secured to said pedestal, and an outer barrel comprising one or more cylinder segments bearing a finishing coat of enamel or paint on the outside surface and in which the sight opening window frame is formed by bossing out the metal of the segment, said outer barrel removably secured to the pedestal.

11. In a computing scale, a barrel provided with one or more sheet metal cylinder segments in which the sight opening frame is formed by bossing out the metal in the segment, and means located to the inside of said bossed-out frame for detachably supporting a glass lens on the inside.

12. In a computing scale, a barrel provided with one or more cylinder segments in which the sight opening frame is formed by bossing out the metal in the segment, means located to the inside of said bossed-out frame for supporting a glass lens on the inside, comprising clips located on the inside of the bossed-out metal frame for supporting the lens at the inside.

13. In a scale, a barrel which includes a barrel portion in which a longitudinal portion of the segment is pressed outwardly to form a boss of considerable relative depth and with a sight opening, a glass lens supported in the boss and in back of the sight opening, and one or more clips supported in said boss for holding the lens in place.

In testimony whereof I have affixed my signature.

BERT W. KING.